(12) United States Patent
Corrigan et al.

(10) Patent No.: US 7,464,178 B2
(45) Date of Patent: Dec. 9, 2008

(54) OPEN MESSAGING GATEWAY

(75) Inventors: Louis Corrigan, Enfield (IE); Clive Steady, Dublin (IE)

(73) Assignee: Markport Limited, Dublin (IL)

( * ) Notice: Subject to any disclaimer, the term of this patent is extended or adjusted under 35 U.S.C. 154(b) by 1113 days.

(21) Appl. No.: 10/717,968

(22) Filed: Nov. 21, 2003

(65) Prior Publication Data

US 2004/0148357 A1 Jul. 29, 2004

Related U.S. Application Data

(63) Continuation of application No. PCT/IE02/00067, filed on May 23, 2002.

(60) Provisional application No. 60/292,524, filed on May 23, 2001.

(30) Foreign Application Priority Data

May 23, 2001 (EP) .................................. 01650060

(51) Int. Cl.
*G06F 15/173* (2006.01)
(52) U.S. Cl. ...................... 709/238; 709/206; 709/226; 709/230; 370/351; 370/400; 370/401
(58) Field of Classification Search ........................ None
See application file for complete search history.

(56) References Cited

U.S. PATENT DOCUMENTS

| | | | |
|---|---|---|---|
| 5,742,905 A | 4/1998 | Pepe et al. ................. 455/461 |
| 6,055,236 A * | 4/2000 | Nessett et al. ............... 370/389 |
| 6,198,920 B1 * | 3/2001 | Doviak et al. ............ 455/426.1 |
| 6,621,895 B1 * | 9/2003 | Giese .................... 379/201.03 |
| 6,714,778 B2 * | 3/2004 | Nykanen et al. ......... 455/414.1 |
| 6,859,879 B2 * | 2/2005 | Henn et al. ..................... 726/1 |
| 6,910,074 B1 * | 6/2005 | Amin et al. .................. 709/227 |
| 6,931,429 B2 * | 8/2005 | Gouge et al. ................ 709/203 |
| 6,937,588 B2 * | 8/2005 | Park ........................... 370/338 |

(Continued)

FOREIGN PATENT DOCUMENTS

EP 1043671 A2 10/2000
WO WO98/47270 10/1998

OTHER PUBLICATIONS

Cannataro et al, "A Component-Based Architecture for the Development and Deployment of WAP-compliant transactional Devices," Jan. 2001, Proceedings of the 34th Hawaii International Conference on System Sciences, pp. 1-10.*

(Continued)

*Primary Examiner*—Bunjob Jaroenchonwanit
*Assistant Examiner*—Dohm Chankong
(74) *Attorney, Agent, or Firm*—Jacobson Holman PLLC

(57) ABSTRACT

A messaging gateway (1) has a network node layer (20) which interface with mobile devices and manages context for them. A gateway node layer (30) controls access to applications and other functions such as billing. An applications node layer (25) provides requet/response mechanisms for access to applications on external servers. The network node layer (20) has a number of adapters, each associated with a type of mobile device. The gateway node layer (30) has nodes with access brokers which control access to applications according to user subscriptions, and responses are split up and routed according to adapter capabilities.

16 Claims, 3 Drawing Sheets

U.S. PATENT DOCUMENTS

| | | | |
|---|---|---|---|
| 6,968,553 B1 * | 11/2005 | Theeten | 719/311 |
| 6,976,080 B1 * | 12/2005 | Krishnaswamy et al. | 709/230 |
| 7,072,934 B2 * | 7/2006 | Helgeson et al. | 709/203 |
| 7,092,370 B2 * | 8/2006 | Jiang et al. | 370/329 |
| 7,124,413 B1 * | 10/2006 | Klemm et al. | 719/313 |
| 7,194,558 B2 * | 3/2007 | Kawamoto et al. | 709/249 |
| 7,237,261 B1 * | 6/2007 | Huber et al. | 726/12 |
| 7,272,662 B2 * | 9/2007 | Chesnais et al. | 709/246 |
| 2001/0016880 A1 * | 8/2001 | Cai et al. | 709/321 |
| 2002/0049675 A1 * | 4/2002 | Kailamaki et al. | 705/44 |
| 2002/0069182 A1 * | 6/2002 | Dwyer | 705/80 |

OTHER PUBLICATIONS

Bellavista et al, "Mobile Agent Middleware for Mobile Computing," Mar. 2001, Computer 34, 3 (Mar. 2001), 73-81.*

Korva et al, "On-Line Service Adaptation for Mobile and Fixed Terminal Devices," In Proceedings of the Second international Conference on Mobile Data Management (Jan. 8-10, 2001). Lecture Notes in Computer Science, vol. 1987. Springer-Verlag, London, 252-259.*

* cited by examiner

OPEN MESSAGING GATEWAY

This is a continuation of PCT/1E02/00067 filed May 23. 2002 and published in English which in turn was based on provisional Application No. 60/292524 filed May 23, 2001.

INTRODUCTION

The invention relates to a messaging gateway for use by mobile networks.

PRIOR ART DISCUSSION

At present, it is often the case that a new access mechanism is needed for each new user device technology. This results in a requirement for skilled developers and use of toolkits and IDEs which increase commitment to a single technology. Conversion systems have been developed to address these problems, for example systems for Web-based automatic translation of HTML to WAP or CHTML. However this approach often provides only short-term benefits and also suffers from the problem of allowing a low degree of interactivity. Also, the linkages through the translation functions are relatively easy to break. In another approach, there is XML-centric automatic translation in which XML is translated into formats such as WAP or HTML. However, this approach does not provide support for different degrees of interactivity, and there is little user context support.

The invention addresses these problems.

SUMMARY OF THE INVENTION

According to the invention, there is provided a messaging gateway comprising:
- a network node layer comprising means for interfacing with user mobile devices of a plurality of different communication standards to receive content or service requests from the mobile devices and to route responses to the devices;
- a gateway node layer comprising means for routing the requests and the responses and for modifying them according to device technology and content attributes; and
- an application access node layer comprising means for accessing content servers and application servers.

In one embodiment, the network node layer comprises means for managing the context for a device making a request, and for converting an input into a Web request using input data, device context, and application context.

In another embodiment, the network node layer comprises means for adding user and location context to requests.

In a further embodiment, the network node layer comprises means for translating responses into a device-specific format using response date, device context, and application context.

In one embodiment, the network node layer comprises means for updating and storing context between device interactions.

In another embodiment, the network node layer comprises a plurality of adapters, each associated with a type of mobile device.

In a further embodiment, the gateway node layer comprises means for controlling access to Web applications according to user subscription, in which responses are split up and routed according to adapter capabilities, content attributes, and user-specified rules.

In one embodiment, the gateway node layer comprises means for managing a register of adapter capabilities and of currently accessible adapters for each user.

In another embodiment, the gateway node layer comprises means for translating service values placed by applications, and for routing the translated data to external systems.

In a further embodiment, the application access node layer comprises means for an API to allow alternative interfaces for interactive applications.

In one embodiment, the network node layer, the gateway node layer, and the application access node layer comprise means for communicating with each other using an XML-compliant markup language.

In another embodiment, in said markup language, content is defined in elements, in which a root element is an abstraction of a mobile device screen.

BRIEF DESCRIPTION OF THE DRAWINGS

The invention will be more clearly understood from the following description of some embodiments thereof, given by way of example only with reference to the accompanying drawings in which:—

DESCRIPTION OF THE EMBODIMENTS

Figure 1:
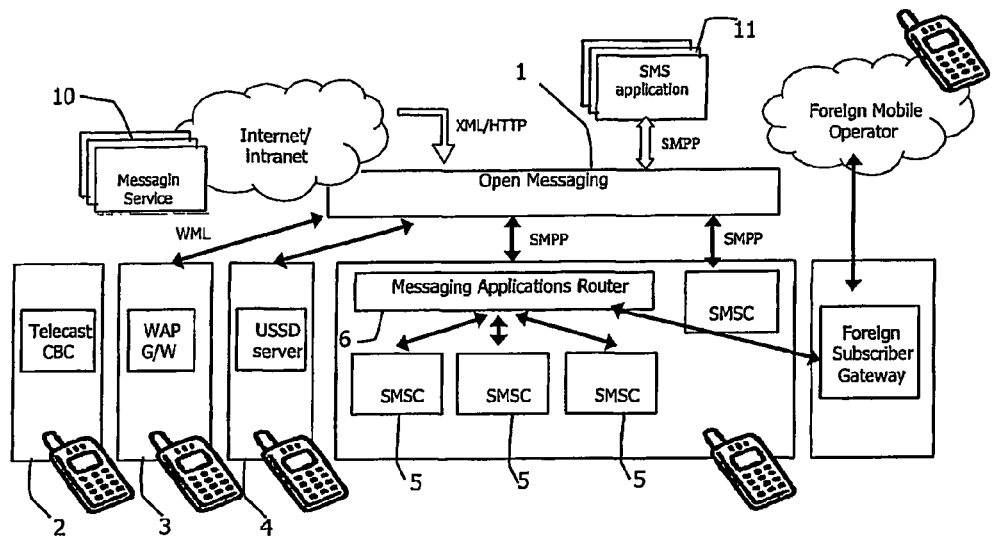
FIG. 1 is a diagrammatic representation showing context of a gateway of the invention.

Referring to FIG. 1, an open messaging gateway (OMG) 1 allows Web (HTTP) applications and mobile network (SMPP) applications to send and receive messages such as short messages. The gateway 1 removes the complexity of the underlying messaging network from the application developer.

In addition to these core functions the gateway 1 provides a set of supporting service management functions. Support is provided for service level billing and access management. The product architecture is highly scaleable to manage the ever-increasing number of messaging applications and the volume of transactions that they will generate. The gateway comprises a high-availability hardware configuration to ensure no loss of service in the event of a single point of failure.

The gateway 1 may interface with the following in the user domain (some of which are shown in FIG. 1):—
- a cell broadcast centre (CBC) 2,
- a WAP gateway 3,
- a USSD server 4,
- a multi-media services centre (MMSC) MM7,
- a number of SMSCs 5 via a messaging applications router 6 or directly, and a foreign subscriber gateway 7 via the router 6.

In the application domain the gateway 1 may interface with:—
- messaging services 10 via the internet or an intranet, and
- SMS applications 11.

On the network (user) side, the devices may be referred to as "micro" devices because they are small, more "personal", and have lower levels of processing power than traditional counterparts in the fixed-line Internet domain. There is a wide range of both capabilities and access protocols. Micro device have displays which range from simple text-only LCD displays in low-end handsets through to high resolution, high colour TFT displays in laptop computers. In most cases, phone-based micro devices have only a limited ability to run scripts and decode compressed and encrypted data. However, PDAs and laptop computers have processors many times more powerful and are capable of decoding streaming multimedia feeds and complex security protocols. Typically, phone-based micro devices are built with limited data storage capabilities. PDAs and smart phones may have several megabytes and laptop computers may have several gigabytes. Presently, micro devices are using SMS, USSD and CSD technologies to connect to the Wireless Internet. Data transfer rates are slow and the device only sets up a data connection when initiated by the user. Shortly we will see devices using 2.5G technologies such as GPRS and EDGE working at much higher data rates. Many of these devices will offer an 'always on' capability, enabling them to receive Wireless Internet content without the user having to actively establish a data session. In the future, we will see new 3G devices that offer even greater data transfer rates. These devices may well be true IP devices offering an 'always on' connection directly to the Internet.

As the Wireless Internet grows and attracts an ever more diverse set of users with differing requirements it is likely that we will see the range of micro devices expanding in response. Without a structured approach, providing compatible Wireless Internet services is going to become increasingly more difficult.

Figure 2:
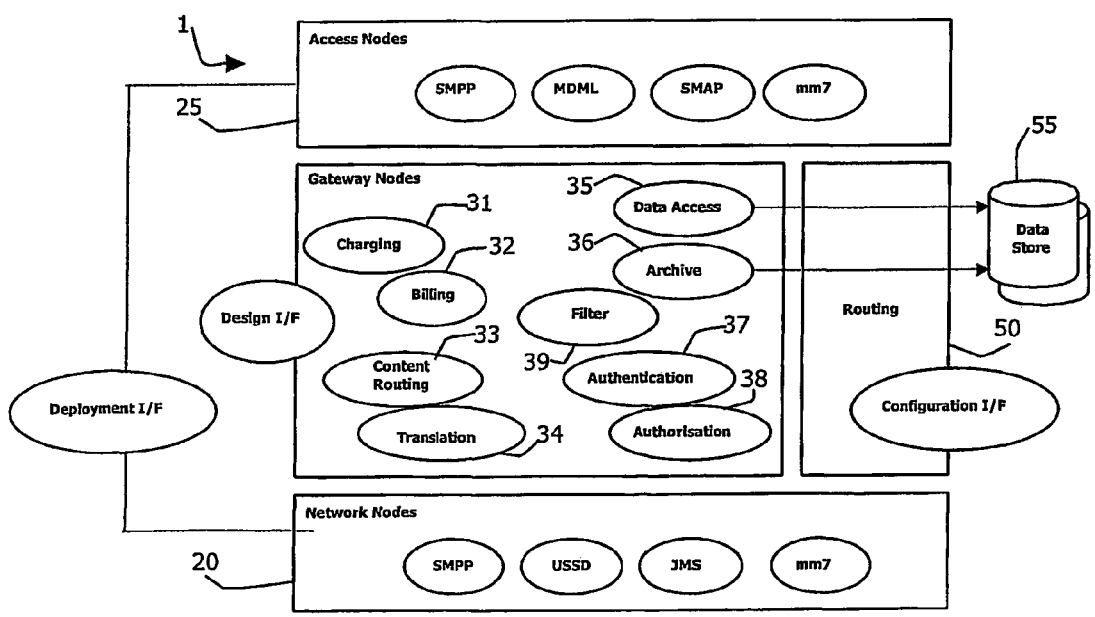
FIG. 2 is a diagram illustrating architecture of the gateway.

Referring to FIG. 2 the architecture of the gateway 1 is shown. The architecture is modular, in which resource-intensive translation functions are separate from interfacing functions. There is a user-side network node layer 20 having SMPP, USSD, JMS, and MM7 interfacing nodes. On the application side there is layer 25 of SMPP, MDML, SMAP, and MM7 access nodes. Internally, the gateway 1 comprises gateway nodes 30, namely:
 a charging node 31,
 a billing node 32,
 a content routing node 33,
 a content translation node 34,
 a data access node 35,
 an archive node 36,
 an authentication node 37, and
 an authorization node 38.

A routing interface 50 allows access by the data access node 35 to a data store 55.

The gateway nodes 30 provide application and network interfaces, and a series of configurable routing, validation, and filtering functions that provide content and routing management of all messaging traffic that passes through the gateway 1.

Figures 3A, 3B:
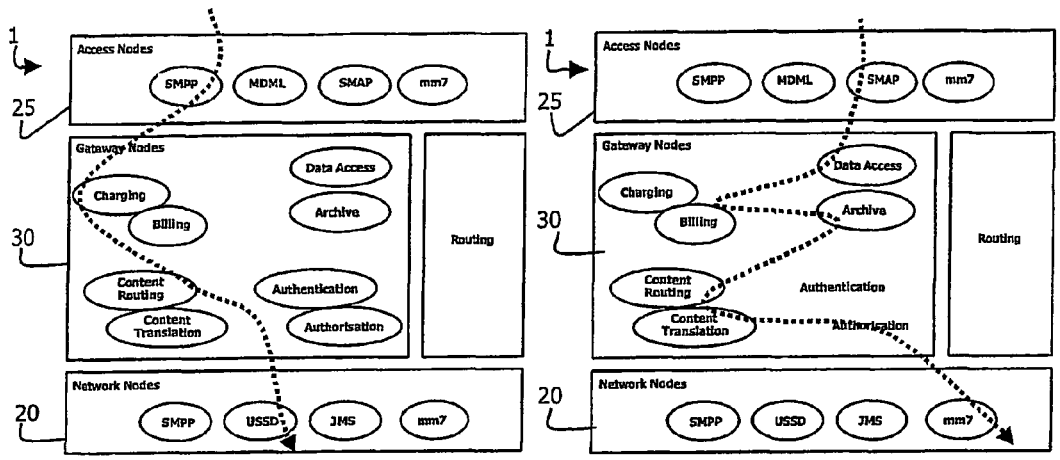
FIGS. 3(*a*) and 3(*b*) are diagrams showing alternative routes through the gateway.

The modular nature of the architecture supports the rapid deployment of additional network and application adapters, allowing new services to be readily provided over multiple interfaces. In addition, the flexible validation and filtering capabilities provided by the gateway 1 allow highly configurable routing of message traffic through a series of processing nodes in the gateway 1, as shown in FIGS. 3(a) and 3(b). This routing allows operators to provide highly complex and innovative services with minimum configuration and initial cost.

The service provided by the gateway 1 in each case is determined by the path taken through the available pool of gateway nodes 30. Each node represents a block of functionality, implementing in one case for example a filtering function, in another, a content transformation, in yet another, analysis of the destination address to provide routing. An advantage of the gateway 1 is the use of a standard API framework for the nodes 20, 25, and 30, which makes the creation of additional nodes implementing new functionality, a relatively straightforward and cost-effective process. The validation nodes are configurable and allow operators to guarantee confidentiality, integrity and authentication of all messaging traffic.

The gateway 1 provides a unique message identifier for each message, which is assigned on message submission into the gateway 1. Mapping between network platform message IDs (e.g. SMSC message IDs) is handled automatically by the gateway 1.

The access node layer 25 performs the following interfacing:—

Short Message Peer to Peer (SMPP)
 Allows SMPP ESMEs to connect to the gateway 1
 Supports SMPP version 3.3 and 3.4
 Transparent Mode: acts as SMPP relay, windowing performed on SMSC
 Non-transparent mode: acts as SMSC with local windowing and local acknowledgements
 Message administration support
 Load throttling and rating functions
 ESME management interface for deployment, access control and message routing
 Converts MO plaintext SMS and USSD into HTTP requests in MDML format
 Converts MDML HTTP responses into MT plaintext SMS or USSD
 Manages an interactive session on behalf of the SMS or USSD subscriber
 Supports web access to ringtones and picture messaging
 Provides push interface to trigger interactive SMS session with a subscriber Micro Device Markup Language (MDML)
 The layer 25 accesses interactive applications over SMS and other mobile technologies. Applications can be written in Micro Device Markup Language (MDML), a Logica Mobile Networks PLC proprietary XML format for mobile applications. It allows developers to produce applications very quickly using web development techniques and then to access these applications over HTTP from a variety of transport mechanisms including plaintext SMS and USSD. The gateway 1 provides the automatic conversion between MDML and native wireless formats. This capability can easily be extended through the addition of nodes, to deliver for example, a WAP interface or a cHTML interface.

MDML greatly simplifies the process of creating wireless applications, without needing to be aware of the specifics of bearers such as SMS. As an example, a ringtone download can be achieved in just six lines of MDML:

```
<panel title="myring">
    <soundsnippet
        alt="my tune"
        format="GSM-NOKIA-RINGTONE"
        link="mytune.rtt"/>
</panel>
```

The ringtone in "mytune.rtt" can be accessed simply be sending an SMS text "command" or selecting a USSD menu option. In each case, the gateway 1 performs seamless conversion between the underlying application as expressed in MDML and the formats understood by each wireless data technology.

Figure 4:
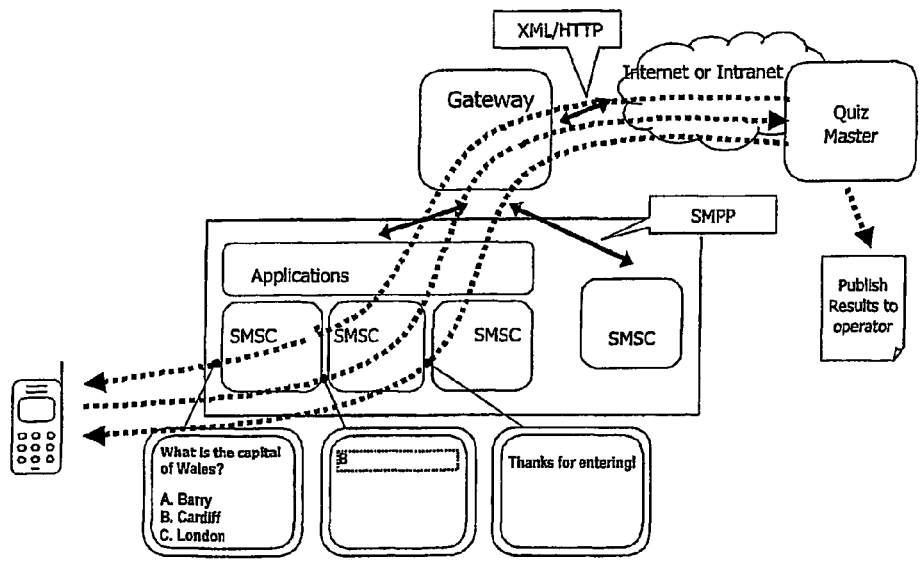
FIG. 4 is a diagram illustrating signals for an interactive application.

A further example is a simple interactive quiz application using SMS. This is illustrated in FIG. 4. A question based on the MDML template is adapted to a plaintext Short Message by the gateway 1 and routed to the subscriber. The subscriber responds with an answer, and the OMG processes the response, selecting the correct MDML template to deliver the result.

SMS Push

The gateway 1 supports the pushing of MDML content from the application to the subscriber. In such a scenario, the gateway 1 receives a HTTP POST containing the MDML content. The gateway 1 performs verification of the sending application based on IP address and account information present in the MDML, and then forwards the content onto the subscriber. The gateway 1 can also handle context information within the MDML. This allows a session to be initiated with the user for subsequent pull interaction. For example, an application might push details of a newsflash to the subscriber, and the subscriber will subsequently pull down more detailed information on the news story.

In addition, the gateway 1 can handle MDML link information in the Pushed data. In this scenario, the application does not push content directly, but pushes a link to the relevant content. The gateway 1 retrieves the page specified by the link, and sends this content to the user.

Short Message Application (SMAP) Protocol

SMAP is an XML protocol from the SMS forum that provides equivalent functionality to SMPP over a variety of web protocols including HTTP. This will allow developers to write applications that send and receive SMS messages using a simple XML format, with:

XML parsing of SMAP messages, conversion of SMAP requests to and from internal gateway 1 message formats, and application provisioning and access control.

In the network node layer 20, the gateway 1 supports Short Message Peer-to-Peer (SMPP) protocol and unstructured Supplementary Services Data (USSD) functionality.

For SMPP there is full Support for SMPP version 3.3 and 3.4, full windowing protocol, transparent support for Large Messages, and Message Cancel, Update and Query operations.

The gateway 1 can make a direct SMPP connection to the SMSC, or it can be deployed together with the Messaging Application Router (MAR) 6 to provide support for multiple SMSCs 5, and for interfaces to networks supporting different wireless technologies.

For USSD, the gateway handles USSD over SMPP version 3.3 to a USSD server, USSD session management, application routing capability, protocol conversion to SMS and interactive applications, and USSD phase 2 primitive support.

Figure 5:
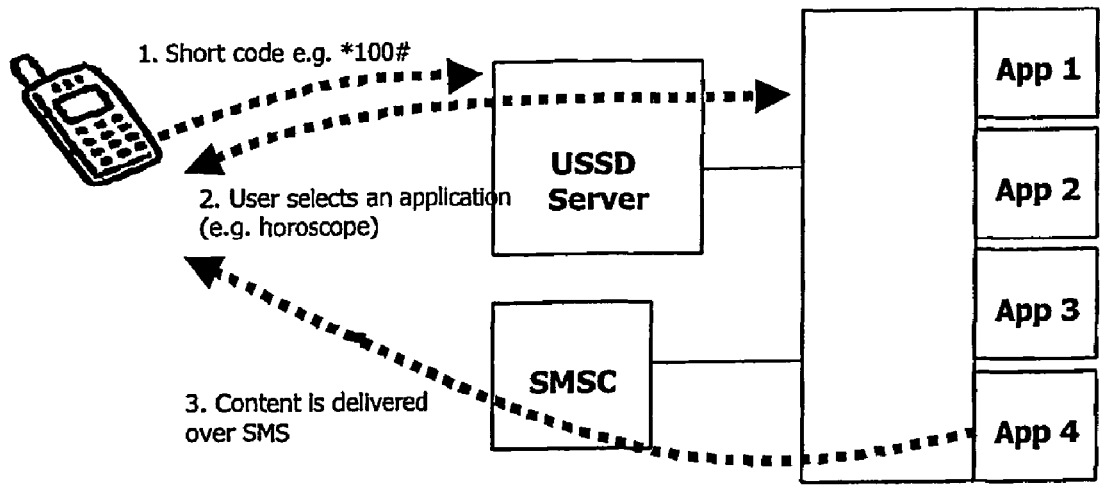
FIG. 5 is a diagram illustrating interaction with USSD data.

This interface allows the gateway 1 to provide a top-level menu for an operator's USSD services. In this scenario, the gateway 1 is responsible for routing subscriber requests to the correct applications and for maintaining a top-level menu for subscribers. Data from the applications is routed back to the subscriber device through the SMSC as shown in FIG. 5.

The following describes the gateway nodes 30 in more detail.

Filter Node 39

This is a generic node used to process messages and forward them in a structured fashion. The filter node 39 can modify or delete a message but cannot reroute messages or generate new ones.

Billing Node 32

The billing node generates Call Detail Records (CDRs) for offline processing. It is flexible and fully configurable for both standard and custom billing events. The CDR format can be configured on a per-node basis and the data elements within the CDR are extracted from the standard OMG message format using a mixture of preset and operator-configurable extraction rules. Typical contents of a CDR include Message Source and Destination, Timestamp, Delivery Parameters, Device Type, and can include the actual Text.

Charging Node 31

This node provides a prepaid billing interface to a PSA (prepaid service agent). The interface uses the PSA PSP-CAP (Content Application Protocol), providing content charging support. The PSA processes credit checking and adjustment requests from the external system, maintaining contact with the Intelligent Network Platform (INP) to ensure that the subscriber's credit will never become negative. The PSA produces call or event detail records for all of its transactions. These are sent to an INSS CDR/EDR Loader to be made available to the customer care interfaces. The node 31 interfaces to the PSA to generate a charging event; passes service context parameters to a PSA interface; allows configuration of standard charges per destination, service context and billing context, and actions on success and failure.

Database Node 35

This node has two related functions—updating the database 55 with selected contents of a message and updating a message with data extracted from a database. Each database node operates on a specific table within one database using a pre-configured database operation. A database node designer tool allows an administrator to specify the database name, the table name, database access control parameters, the SQL command to be used, gateway message fields to be used in the SQL command, and gateway message fields to be updated on successful completion of the command.

Authentication Node 37

This is a pre-configured database node that authenticates a source address against the gateway access control database.

Authorization Node 38

This is a pre-configured database node that validates a message against a configurable set of authorization criteria. These include destination address, source address, service context, message size and contents, and external "anti-spam" components.

Router Node 33

This node routes messages to other nodes based on message contents, system parameters and a configurable routing algorithm. A router node can be configured to route messages based on loading, service context, address information, and custom rules.

Archive Node 36

This node provides a standard interface through which messages can be archived for administrative or user management reasons. The archive can be a simple message log or else a fully functional message store. In the latter case, a fully managed solution can be provided, whereby all short messages transmitted by or delivered to the user are archived and the delivery status of these messages is updated by the OMG as delivery reports and status information passes through the system.

Content Translation Node 34

This is a specialized set of filter nodes that allow the operator to perform custom operations on message content. There is also an address translation node which allows the operator to modify a source or destination address based either on configurable rules or a database operation. Also, a character-set translation node provides a standard mechanism for handling character set translations. A number of character conversions nodes are provided and these can be supplemented with custom conversion nodes. GSM 7-bit to and from ASCII conversion nodes are provided. Also, a keyword conversion node converts keywords and content according to configurable rules. This can be used to change the interface of an application to conform to a standard set of guidelines or to provide a mechanism for routing messages. Each node can be configured to:

set service context parameters based on positional keywords in the message text, convert selected keywords in the text to specified alternatives, and match an entire message text and replace it with an alternative text.

The gateway node layer 30 comprises a set of application templates which provide a web-based front end for simple application development. The templates are available for information and competition applications and dramatically reduce application development time for these types of application as they remove the need for application developers to have any XML skills. The gateway layer and service administration interfaces provide the tools to manage the applications created using these templates.

The gateway node layer 30 also comprises the following administration interfaces:

Configuration Manager

This allows the operator to add and remove nodes from the system and to configure the distribution of functionality across the system. It also allows the operator to specify configuration parameters for individual nodes.

Deployment Manager

This is used to create nodes from node definitions and to group nodes together to provide specific deployment configurations.

Node Design Tool

This provides a graphical interface through which new nodes definition can be created. The designer can select the base type of the node definition and then perform type-specific configuration. A standard OMG node type such as the database access node is integrated with the design tool so that the designer can easily specify the message fields to be used and the SQL parameters to be configured.

Service Administration

This allows the service administrator to create new messaging services and specify the parameters that allow the gateway 1 to route messages to these services. A full set of user administration functions is provided so that new service administrators can be created and managed.

Operator Interface

Provides a mechanism for starting and stopping the OMG and checking its current status.

Figure 6:
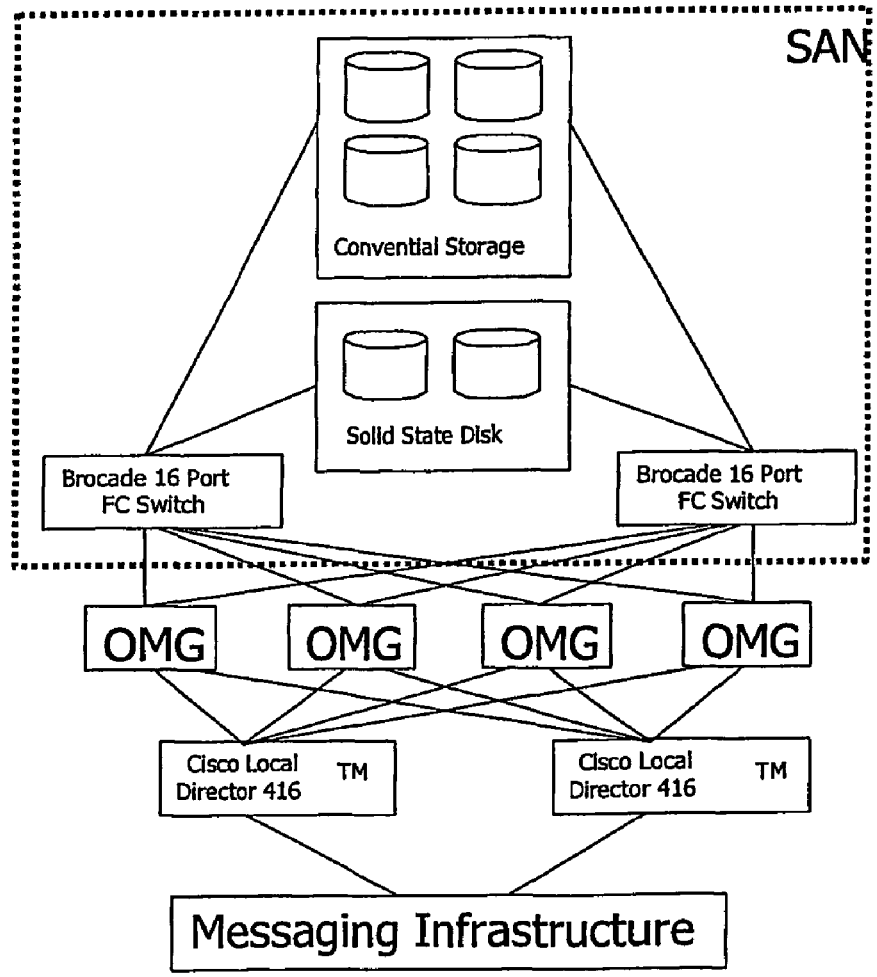
FIG. 6 is a diagram illustrating a gateway hardware configuration.

The hardware of the gateway 1 comprises a number of HP's L-Class (rp5400) servers. This is a reliable platform, with scalability and redundancy. The software comprises HP-UX and the Apache Tomcat Java runtime environment and Web Server. The gateway layer comprises a fully resilient n+1 configuration, including the following elements, as shown in FIG. 6:

gateway messaging platforms, a Storage Area Network (SAN), and an IP load balancing hardware (Cisco Local Director™).

The SAN meets the requirements for shared storage between multiple gateway servers. SAN design consists of a pair of Brocade Fibre-Channel switches and a mix of conventional and solid state storage to provide a resilient, highly available and high-performance storage. The mix of storage (conventional and solid state) is for performance reasons. The session data requires low latency in order to minimise the response time to any individual message being handled. Conventional storage is appropriate for all the remaining shared data.

A fully duplicated Cisco Local Director 416 configuration is used to allow IP connections from the messaging infrastructure to be load-shared over the OMG platforms.

Within the gateway 1 the nodes 20, 25, and 30 communicate with each other using the Micro Device Mark-up Language (MDML). The network access nodes 20 comprise a number of technology adaptors, each responsible for allowing services and content to be delivered to a specific class of micro device including:

SMPP, OIS and EMI protocols for SMS via Logica, Sema and CMG SMSCs respectively

SMPP for USSD via Logica's USSD Server

WML for WAP devices

HTML cHTML for i-Mode phones

SMTP for e-mail delivery

Each of these device classes has different capabilities and different methods of connecting to the wireless internet. The primary function of each of the technology adapters is to 'shelter' application and content developers from these differences, allowing them to work with a standard, micro device, interface. In order to do this, technology adapters for less capable micro devices (such as SMS-only phones) build this additional functionality into the network. As new classes of micro device come to market, new technology adapters will be created. This will allow new devices to access existing services without the need to redevelop and test existing content and application code.

The gateway nodes 30 which handle messaging each comprises an access broker which performs a number of tasks, including:

maintenance of a subscriber register, the services to which they have subscribed and their preferences, policing of user access to applications and content, ensuring users are only able to access services to which they have subscribed, where a subscriber has access to a range of micro devices, routing content to the most appropriate, and interface to billing and advertisement engines.

The access node layer 25 is where wireless Internet applications and content resides. Fixed content is formatted as MDML Web pages that are provided to the access broker by a standard Web Server platform. Dynamic content is provided using industry standard Java server side technology, i.e. Java Servlets and JSP.

Applications also send and receive data to and from the technology adapters using MDML and HTTP. To minimise the effort required to generate MDML from within application code the framework includes a Java based MDML API.

However, as MDML is an open specification, it is also possible develop MDML compliant applications using in-house code or development environments other than Java.

Each technology adapter converts between a specific device technology and the micro device protocol. A technology adaptor has the following core functions:

provision of a receiver and transmitter giving access to the underlying network transport mechanism for the device, translation of incoming messages into MDML requests that are sent to the access broker via HTTP 'post' messages, translation of MDML responses from the access broker into the format used by the underlying network transport mechanism, and management of user and device context—this enables users to enter the minimum number of keystrokes required to access the services they require.

In the gateway node layer 30 the access broker:

brokers user access to content and applications for 'pull' type operations, and brokers application access to user's micro devices for 'push' type operations.

This allows users, service providers, content providers and application developers to specify which services are available to which users and on which devices. Both pre-paid and post-paid billing for content and services is also managed by the access broker.

A request from a technology adaptor in the layer 30 is dealt with by an access broker in the layer 30. On receiving a request, the access broker:

identifies the associated application, checks user subscription to the application, performs any pre-access checks and debits the user's account if necessary, forwards the request to the application, performing any re-routing and URL translation required.

On receiving a response, the access broker:

parses the message, performs any billing or charging on the panel, generates advertising content based on the application information and the panel contents, determines where individual components of the message should be sent depending on the available device adaptors, and assembles and sends the individual message components to the appropriate adapters.

Applications are defined as a set of MDML pages with associated logic, image and sound files. An application is defined in an application configuration file that specifies the following:

the application name, the style-sheets and device configurations associated with the application, the locations of the application's associated files, its billing capabilities, and images and icons used to identify the application to the user (e.g. on a personalization web page or in a PDA folder).

An application's files reside in a directory hierarchy that can be packaged up and deployed in a new location without any porting constraints.

There are many ways that applications and content can be developed. An application consists of both MDML content and logic. The logic resides in a series of Java Beans that are invoked automatically when a given action is triggered by the user. A standard mapping mechanism is used to ensure that all actions either link to a new panel or are handled by a Java Bean. This allows an application developer to simulate dynamic behaviour using either static panels, JSP or both and then transparently migrate to a more interactive solution without any re-deployment problems.

Micro Device Mark-Up Language

MDML provides a simple abstract mechanism for defining mobile data to be presented to a user over a variety of devices. It is a 'content only' format—formatting and styling have been excluded deliberately in order to provide a definition that is both device and protocol independent. MDML allows a content editor (or a dynamic content generator) to:

define content for micro devices in a hierarchical fashion, associate actions and links with content, define advertising related instructions for content, and specify billing mechanism for content.

Since MDML is an XML-compliant data format, it is possible to translate XML data feeds into MDML using standard style-sheet technology. It is also possible to translate MDML into HTML and WML using style-sheets.

Content Definition

MDML allows editors to create simple text-based content. Editors can also associate a set of images and sound files with the content. The root element of all MML content is a panel. A panel can be regarded as an abstraction of the screen on the mobile device. A panel contains one of the following elements:

Text—Character data arranged in paragraphs.

Menu—This defines a menu of items from which the user can select.

List—This defines an ordered list of items which may or may not be selectable.

Form—This is a panel through which the user can enter information.

Table—A tabular set of information.

A panel element can be associated with sound and image elements. Sound elements can be defined as either short duration sound snippets that can be transferred to the micro device over standard communication links or sound streams that must be accessed by a different mechanism such as a streamed voice connection or an mp3 device. Image elements are defined in an image set. An image set is a set of image files containing different versions of the same image. These versions may be in different encoding formats (e.g. GIF or WBMP) and of different sizes. They each have a set of attributes that define:

The encoding format

The image size

The allowable transformations for this version of the image

This provides a mechanism that allows different images to be sent to different devices, thus enabling the content editor to control the appearance of the image precisely.

Linking and Actions

Elements can also have actions and links as attributes. An action attribute defines an action that can be performed on the element (e.g. selection). A link attribute defines another MDML panel to which control is transferred automatically when it is triggered. A panel can also define action elements. Action elements are triggered by the user in some device-specific manner. As with an action attribute, an action element may have an associated link that is accessed automatically when the action is trigged.

Advertising Support

A panel can have associated with it a set of elements defining the advertising context of the panel. These define whether advertising is supported for the panel and either define a link from which advertising content can be extracted (e.g. a sponsor's message) or else define categories which can be used to determine advertising for the panel.

Content Billing

MDML defines elements that determine how billing is performed on the panel. Editors can define the type of billing for a panel and can define values for the billing itself. Billing elements can contain either a numeric value or a category. A numeric value corresponds directly to the amount that should be debited from the users account. A category (e.g. PREMIUM or SPORT) determines which user profile the user must belong to in order to access the content.

It will be appreciated that the applications framework 1 supports device-to-server interaction in a versatile and stable manner. It allows a high degree of user interactivity, and also excellent personalization because of storage of user contexts. The framework also allows use of a wide range of access devices. Another important advantage is that adaptation is based on the actual features of the access device technology so that there is effectively "seamless" access to framework content from different devices. Regarding the content made available through the framework, this includes interactive applications and dynamic content using JSP and MicroWeb APIS. There is excellent content brokering and attribute-based routing as well as enhanced advertising and billing capabilities.

The invention is not limited to the embodiments described but may be varied in construction and detail.

The invention claimed is:

1. A messaging gateway comprising:
    a network node layer including modular network nodes for interfacing with mobile devices of a plurality of different communication standards to receive content or service requests from the mobile devices and to route responses to the mobile devices;
    a gateway node layer including modular gateway nodes for routing the requests and the responses and for modifying the requests and responses according to device technology and content attributes;
    an application access node layer including modular application access nodes for accessing content servers and application servers;
    an API framework for creating network, gateway, and access nodes; and
    wherein the network nodes:
        manage context for a device making a request, and convert an input into a Web request using input data, device context, and application context;
        add user and location context to requests;
        translate responses into a device-specific format using response data, device context, and application context;
        update and store context between device interactions;
        include a plurality of adapters, each said adapter associated with a type of mobile device and sheltering application servers and content servers from device capabilities; and
    wherein the gateway nodes provide a series of configurable routing, validation, and filtering functions that provide content and routing management of messaging traffic that passes through the gateway node layer, and in which the service provided by the gateway node layer is determined by a path taken through said gateway nodes, and in which:
        the gateway nodes control access to Web applications according to user subscriptions, in which responses are split up and routed according to adapter capabilities, content attributes, and user-specified rules,
        a filter gateway node processes messages and forwards them in a structured manner, its functionality allowing it to modify or delete a message,
        a router gateway node has functionality for routing messages to other nodes according to message contents, gateway parameters, gateway loading, service context, and address information, and
    the gateway nodes include database gateway nodes for accessing a database.

2. The messaging gateway as claimed in claim 1, wherein the gateway nodes manage a register of adapter capabilities and of currently accessible adapters for each user.

3. A messaging gateway as claimed in claim 1, wherein the gateway nodes translate service values placed by applications, and route translated data to external systems.

4. A messaging gateway as claimed in claim 1, wherein the gateway node layer layer includes an archive gateway node for archiving messages.

5. The messaging gateway as claimed in claim 1, wherein the gateway node layer includes content transformation gateway nodes for performing custom operations on message content, said nodes including a node for performing character set translation.

6. The messaging gateway as claimed in claim 1, wherein the gateway node layer includes application templates providing a web-based front end for application development.

7. The messaging gateway as claimed in claim 1, wherein the filter gateway node is not permitted to re-route messages or to generate new messages.

8. The messaging gateway as claimed in claim 1, wherein a database gateway node has functionality for updating a database with selected contents of messages, and for updating messages with data extracted from a database.

9. The messaging gateway as claimed in claim 8, wherein said database gateway node operates on a specific table of the database using a pre-configured database operation.

10. The messaging gateway as claimed in claim 1, wherein a database gateway node has functionality for authenticating a source address against an access control database.

11. The messaging gateway as claimed in claim 1, wherein a database gateway node has functionality for validating a message against a configurable set of authorization criteria.

12. The messaging gateway as claimed in claim 1, wherein the application access nodes provide alternative interfaces for interactive applications.

13. The messaging gateway as claimed in claim 1, wherein the network nodes, the gateway nodes, and the application access nodes communicate with each other using an XML-compliant mark-up language.

14. The messaging gateway as claimed in claim 13, wherein in said mark-up language, content is defined in elements, in which a root element is an abstraction of a mobile device screen.

15. A messaging gateway comprising:
    a network node layer including modular network nodes for interfacing with mobile devices of a plurality of different communication standards to receive content or service requests from the mobile devices and to route responses to the mobile devices;
    a gateway node layer including modular gateway nodes for routing the requests and the responses and for modifying the requests and responses according to device technology and content attributes;

an application access node layer including modular application access nodes for accessing content servers and application servers;

an API framework for creating network, gateway, and access nodes; and wherein the network nodes:
- manage context for a device making a request, and convert an input into a Web request using input data, device context, and application context;
- add user and location context to requests;
- translate responses into a device-specific format using response data, device context, and application context;
- update and store context between device interactions;
- include a plurality of adapters, each said adapter associated with a type of mobile device and sheltering application servers and content servers from device capabilities; and wherein the gateway nodes provide a series of configurable routing, validation, and filtering functions that provide content and routing management of messaging traffic that passes through the gateway node layer, and in which the service provided by the gateway node layer is determined by a path taken through said gateway nodes, and in which:
- the gateway nodes control access to Web applications according to user subscriptions, in which responses are split up and routed according to adapter capabilities, content attributes, and user-specified rules,
- a filter gateway node processes messages and forwards them in a structured manner, its functionality allowing it to modify or delete a message, 16. A computer product comprising software code for executing on one or more computers, in which the code is arranged to implement: a network node layer including modular network nodes for interfacing with mobile devices of a plurality of different communication devices and to route responses to the mobile devices;

a gateway node layer including modular gateway nodes for routing the requests and responses and foe modifiying the requests and responses according to device technology and content attributes;

an application access node layer including modular application access nodes for accessing content servers and application servers;

an API framework for creating network, gateway, and access nodes; and wherein the network nodes:
- manage context for a device making a request, and convert an input into a Web request using input data, device context, and application context;
- add user and location context to requests;
- translate responses into a device-specific format using response data, device context, and application context;
- update and store context between device interactions;
- include a plurality of adapters, each said adapter associated with a type of mobile device and sheltering application servers and content servers from device capabilities; and wherein the gateway nodes provide a series of configurable routing, validation, and filtering functions that provide content and routing management of messaging traffic that passes through the gateway node layer, and in which the service provided by the gateway node layer is determined by a path taken through said gateway nodes, and in which:

the gateway nodes control access to Web applications according to user subscriptions, in which responses are split up and routed according to adapter capabilities, content attributes, and user-specified rules, a filter gateway node processes messages and forwards them in a structured manner, its functionality allowing it to modify or delete a message, a router gateway node has functionality for routing messages to other nodes according to message contents, gateway parameters, gateway loading, service context, and address information, and the gateway nodes include database gateway nodes for accessing a database.

* * * * *